United States Patent [19]

Deregibus

[11] 4,416,721
[45] Nov. 22, 1983

[54] APPARATUS FOR PRODUCING REINFORCED TUBING

[75] Inventor: Alfio Deregibus, Padua, Italy

[73] Assignee: I.T.S. S.r.l., Milan, Italy

[21] Appl. No.: 399,842

[22] Filed: Jul. 19, 1982

[30] Foreign Application Priority Data

May 26, 1982 [IT] Italy ............................. 21494 A/82

[51] Int. Cl.³ .......................................... B32B 31/00
[52] U.S. Cl. .................................. 156/428; 156/185; 156/195; 156/432; 156/190
[58] Field of Search .................. 156/425–432, 156/195, 184, 187–188, 53, 56; 242/4 R, 4 B, 7.0, 7.19–7.23

[56] References Cited

U.S. PATENT DOCUMENTS 2,782,138  2/1957  Olson et al. ........................ 156/431
3,128,216  4/1964  Reed .............................. 156/432 X
4,309,232  1/1982  McIntosh ....................... 156/432 X

*Primary Examiner*—David A. Simmons
*Attorney, Agent, or Firm*—Stevens, Davis, Miller & Mosher

[57] ABSTRACT

A completely automatic process and apparatus are described for producing multi-layer rubber or plastics tubes reinforced with fabric tapes or metal wires.

The apparatus is new both overall and in its individual component units.

Specifically, spiral-forming units of new design are described, which operate in series to each apply a different tape material as a spiral on to the metal core which is fed with rectilinear motion, to form a continuous layer thereon. Unwrapping units are also described for automatically removing and rewinding the outer forming tape for the finished tube.

5 Claims, 6 Drawing Figures

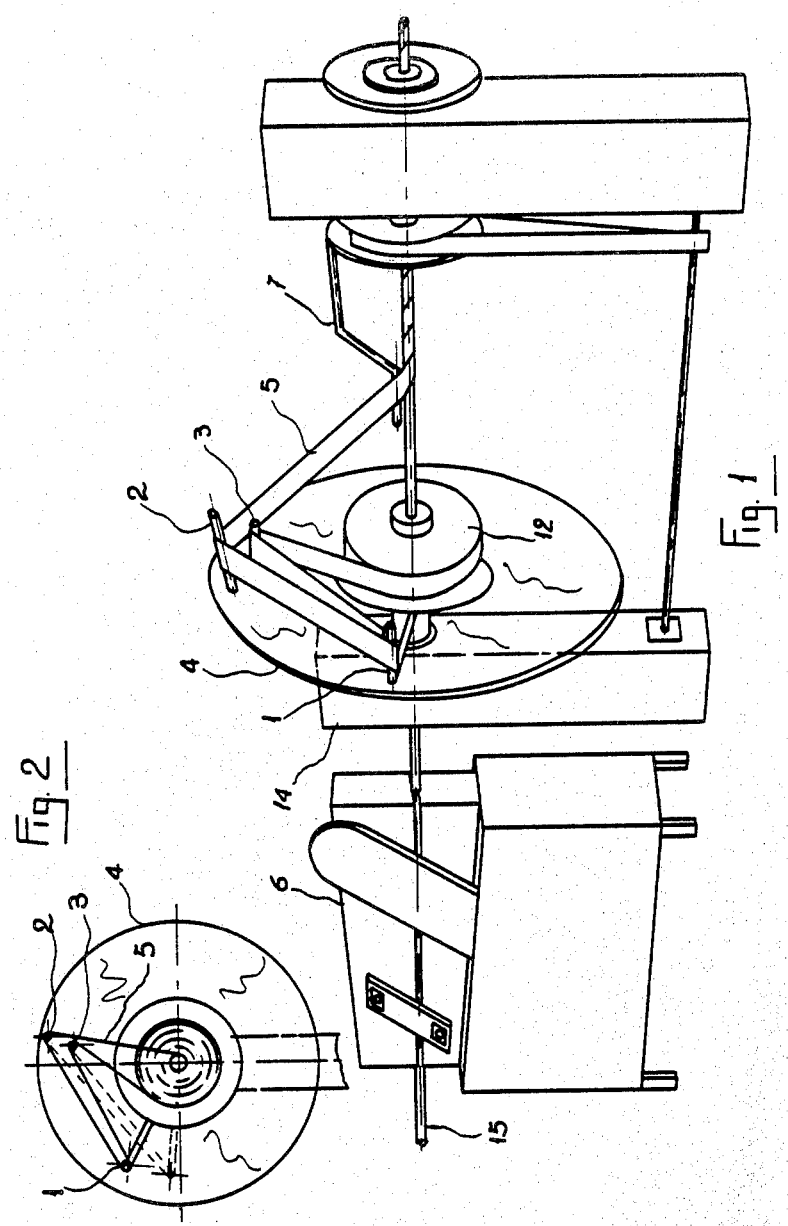

APPARATUS FOR PRODUCING REINFORCED TUBING

This invention relates to a completely automatic process for producing rubber or plastic tubes reinforced with fabric and/or metal wire or tape.

The invention also relates to a completely automatic apparatus for carrying out the new process for producing reinforced rubber or plastic tubes.

The apparatus is new both overall and in each of its component parts.

There is a practically unlimited range of rubber or plastic tubes reinforced with one or more identical or different fabrics, and possibly with one or more windings of identical or different metal wires or tapes. By varying the type of rubber or plastic used, by varying the type and number of reinforcement fabrics, and possibly using metal reinforcements of different types, it is possible to produce tubes suitable for any industrial or agricultural use.

For simplicity, the articles which can be produced by the new process and apparatus according to the present invention will be called "reinforced rubber tubes," it being understood that this comprises the entire range of possible reinforced tubes as heretofore defined, and more precisely described hereinafter.

In general, a reinforced rubber tube means an article of prevalently annular cross-section, comprising essentially three fundamental layers:

A. an innermost layer or substrate of natural or synthetic rubber or synthetic plastic which is impermeable and chemically inert to the fluid conveyed;

B. one or more intermediate layers of fabric or tape comprising parallel filaments (filaments or fabric of nylon, polyester, cotton, artificial fiber, steel, copper and the like), the purpose of which is to enable the tube to resist the pressure of the conveyed fluid and to retain its shape;

C. an outer layer or covering formed from continuous or woven tape of artificial or synthetic material, the purpose of which is to enable the tube to resist the external agents which vary considerably according to the use for which the tube is intended, and the environment in which it is located, such as atmospheric agents, chemically reactive fluids, soil, abrasive forces, heat, low temperatures etc.

Such reinforced rubber tubes have been produced on a rigid or flexible mandrel, by processes which can be briefly summarized as follows:

1. the inner substrate is prepared by spirally winding a crude rubber or synthetic tape manually or semi-automatically about a rotating cylindrical mandrel. The intermediate and outer covering layers are prepared in a like manner.

Using the same method, an outer wrapping, generally of thermally and mechanically resistant nylon fabric, is then applied to the rotating manual in order to externally shape the tube, this wrapping being removed when the tube is finished (unwrapping).

If the inner layer and possibly one or more of the intermediate layers are of crude rubber, the tube is vulcanized after forming but before unwrapping.

This method is very costly because it requires a great deal of labor, but represents the method which is most widely used as it allows tubes to be produced with the most diverse characteristics.

2. The inner substrate is prepared by extruding crude rubber or synthetic thermoplastic material on a mandrel.

The intermediate layers and the covering layer are prepared, as in the first method, by spirally winding fabric tapes from various fibers or metal wires about the rotating mandrel covered by the substrate, either manually or semi-automatically.

If the extruded substrate is of crude rubber, the tube is again vulcanised before unwrapping.

According to a modification of this method, in addition to the substrate, further layers can be applied by extrusion or drawing, rather than by spirally winding tapes.

According to a further modification, wrapping with mechanically and thermally resistant fabric is replaced by the application of a lead sheath which is removed after vulcanisation.

This method, which is less prevalent than the preceding method, is also very costly because of the high labor requirement.

3. The substrate is applied by extrusion or winding as in the preceding methods.

In contrast, the intermediate and covering layers are applied in a horizontal plane by a machine which winds continuous fabric layers in the manner of a cigarette.

This is the least versatile method. This is of the most limited application because the equipment necessary for carrying it out is very costly and requires a great deal of space.

A completely automatic continuous method for the formation of reinforced rubber tubes has now been discovered, and forms the subject matter of the present invention. It is characterised in that both the rubber layers and fabric layers, in the form of tapes, are applied with rotary motion on to a rigid metal core which fed in a rectilinear direction, so that they form successive spirally wound, superposed layers on the core.

The continuous spiral form assumed by the layers is the resultant of the rectilinear translatory motion of the core and the rotary motion about the same imparted to the tape.

The present invention also relates to a completely automatic apparatus for producing tubes by the successive application, as a spiral forming a continuous layer, of rubber tapes, fabric tapes of various kinds, and outer wrapping tapes about a rigid metal core fed with rectilinear motion, according to the process of the present described above.

The new process consists essentially of feeding a metal core with rectilinear motion through various series-disposed units rotating concentrically to the core. The units wind a spiral of tape consisting of rubber, synthetic material or fabric of natural or synthetic fibers, and finally the forming wrapping above the core.

After an optional vulcanization stage, the new process further comprises the automatic removal of the outer forming wrapping for the tube by rectilinearly feeding the core supporting the formed tube through a unit which rotates in the opposite direction to the preceding units.

The machine according to the present invention essentially comprises:

1. a unit for feeding the metal support core for the tube with rectilinear motion
2. several identical units disposed in series concentric to the fed metal core, each arranged to apply a different kind of tape to the metal core in order to form on it a continuous spiral structure.

The first unit applies the spiral layer directly to the core, whereas the subsequent units apply the spiral layers superposed on the preceding layers to form the stratified structure characteristic of reinforced rubber tubes.

The last series-disposed unit applies the outer wrapping layer in the same manner.

These spiral-forming units are constituted essentially by a spool concentric to the metal core and carrying the reel of tape to be applied; a disc adjacent to the spool and independently concentric to the metal core, and on which two suitably inclined arms are fixed in suitable positions for taking-up and tensioning the rubber or fabric tape; a mobile tensioning arm mounted on a cam independent of the disc and having a limited stroke which enables it to absorb and balance any abnormal tensions in the tape, especially during the starting and stopping of the system; a metal disc of diameter approximately equal to the spool and lying opposite this spool, and comprising a tightening arm of suitable shape which rests on the tape to prevent it from deforming and forming creases.

The spool carrying the roll of tape and the disc comprising the tightening arm are driven with rotary motion in opposite directions by two independent motors.

Their rotary movement combined with the rectilinear motion of the core leads to the formation of the continuous rubber or fabric spiral on said core.

3. an optional rubber tube vulcanization apparatus, which is of the type generally known in the art and does not itself form part of the present invention.
4. a unit for driving the formed tube with rectilinear motion.
5. an unwrapping unit constituted essentially by a disc concentric with the advancing tube, having pivoted on its surface, by way of a friction disc, a spool for winding the wrapping tape removed from the finished tube.

The disc is rotated by a motor in such a direction as to unwind the wrapping from the tube surface. Simultaneously, the spool, which is fixed on a pinion engaging with a fixed gear wheel concentric to the finished advancing tube and adjacent to the rotating disc, is compelled to rotate about itself, thus rewinding the wrapping tape as it is removed from the tube.
6. a unit for moving the finished tube rectilinearly, this unit being identical to the preceding units.
7. means for detaching the tube from the core, and for coiling the finished tube, this apparatus also being known in the art and not forming part of the present invention.

The new process and apparatus are described in detail hereinafter with reference to a preferred embodiment illustrated on the acompanying drawings in which:

FIG. 1 is a perspective view of a spiral-forming unit, and the core feed unit disposed at the beginning of the plant FIG. 2 is a plan view from above of the winding disc, the spool and the relative roll of tape

Identical parts are identified by identical reference numerals throughout the drawings.

Figure 3:
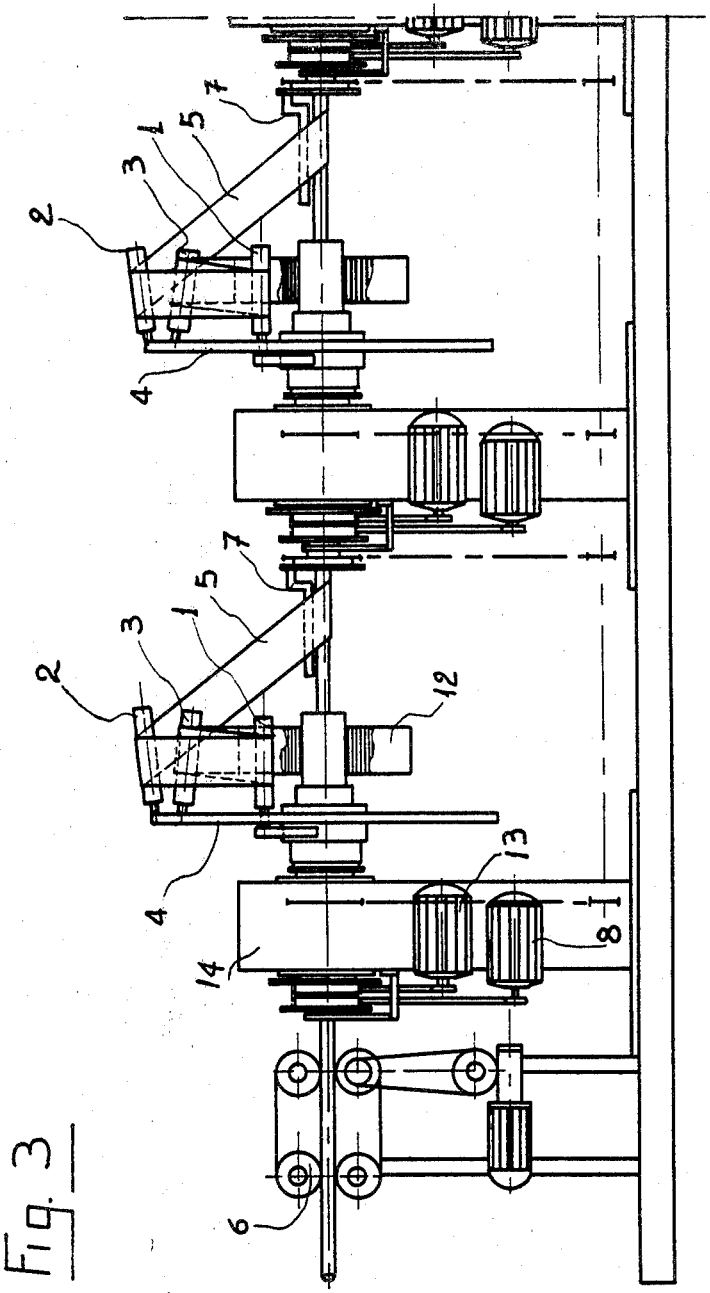
FIG. 3 is a side view of a plant comprising two spiral-forming units and a core feed unit

In FIGS. 1, 2, 3 and 4, the reference numeral 6 indicates the metal core feed unit, 14 the support columns on which the plant rests, and 4 the rotating disc which winds the rubber or fabric tape about the core. This disc can be of any suitable material, for example light alloy or rigid synthetic resin, for example of the polyacrylic or polystyrene type, and is preferably of transparent synthetic resin. 2 and 3 indicate rigid arms of any suitable material, preferably of light alloy, fixed on the disc 4 at such an inclination as to transmit the required positioning and tension to the tape. 1 indicates the tensioning arm, independent of the disc 4 and fixed on to a cam which enables it to make a limited stroke when pulled by an abnormal tension in the tape 5 (in particular during the starting and stopping of the plant), the amplitude of the movement which the cam allows the arm 1 to make being particularly visible in the detailed view of FIG. 2. 12 indicates the roll of rubber or fabric tape mounted on the spool concentric to the metal core. 7 indicates the tightening arm which rests on the rubber or fabric tape and is fixed in a suitable position on a fixed metal disc which opposes the rotating disc 4. 8 is the drive motor for the spool carrying the reel of tape 12; and 13 indicates the drive motor for the rotating disc 4.

Figure 4:
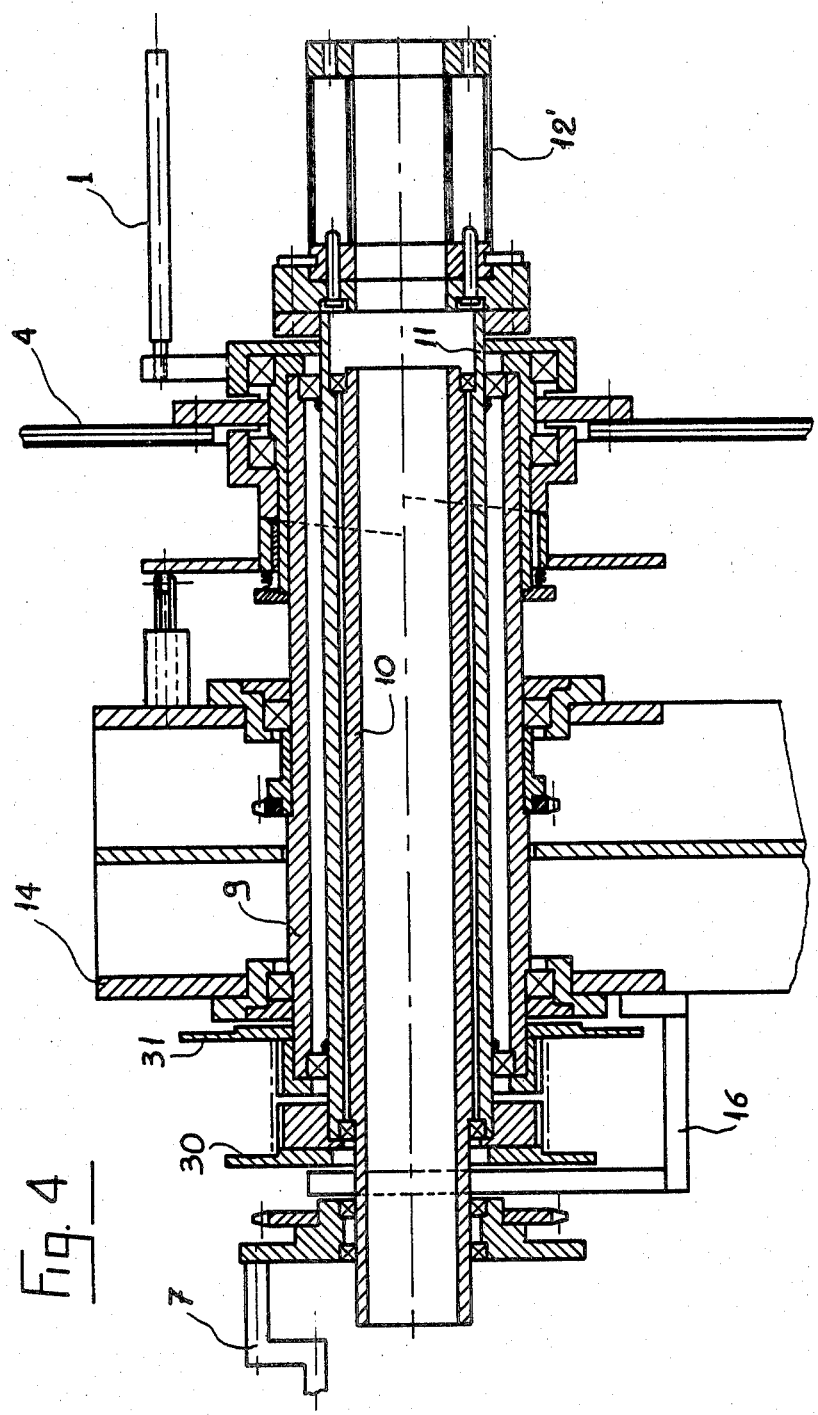
FIG. 4 is a longitudinal section through a spiral-forming unit of FIG. 3

With reference to FIG. 4, it can be seen that by means of the brackets 16, the support columns 14 support a fixed cylinder 10 in which the metal core 15 slides. The cylinder 9, which transmits the motion of the motor 13 to the disc 4, and the cylinder 11, which transmits the motion of the motor 8 to the roll carrying spool 12', are disposed concentrically to the cylinder 10 and slidable on it.

It can be seen from FIG. 4 that the movement of the roll 12 and disc 4 are completely independent.

In reality, these two elements are rotated in opposite directions, the spool for unwinding the tape and the disc for picking up the tape and winding it about the core, with a speed ratio such as to ensure constant tension in the tape as the roll diameter decreases.

It should be particularly noted that as the roll 12 is directly supported by the load-bearing structure of the plant by way of the cylinder 11, it can have a diameter of up to 1 meter, and can therefore ensure a considerable time between roll changes, increasing the self-sufficiency of the plant.

FIG. 4 also shows the brake disc 30 for the roll 12 and the brake disc 31 for the disc 4.

Figure 5:
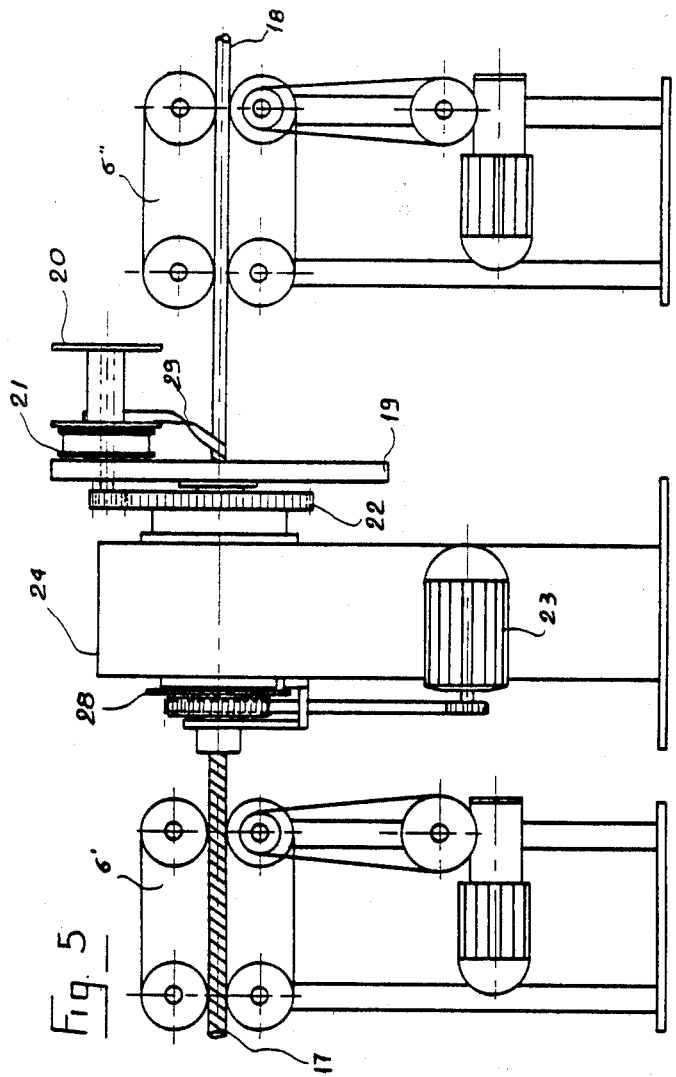
FIG. 5 is a side view of the unwrapping unit
Figure 6:
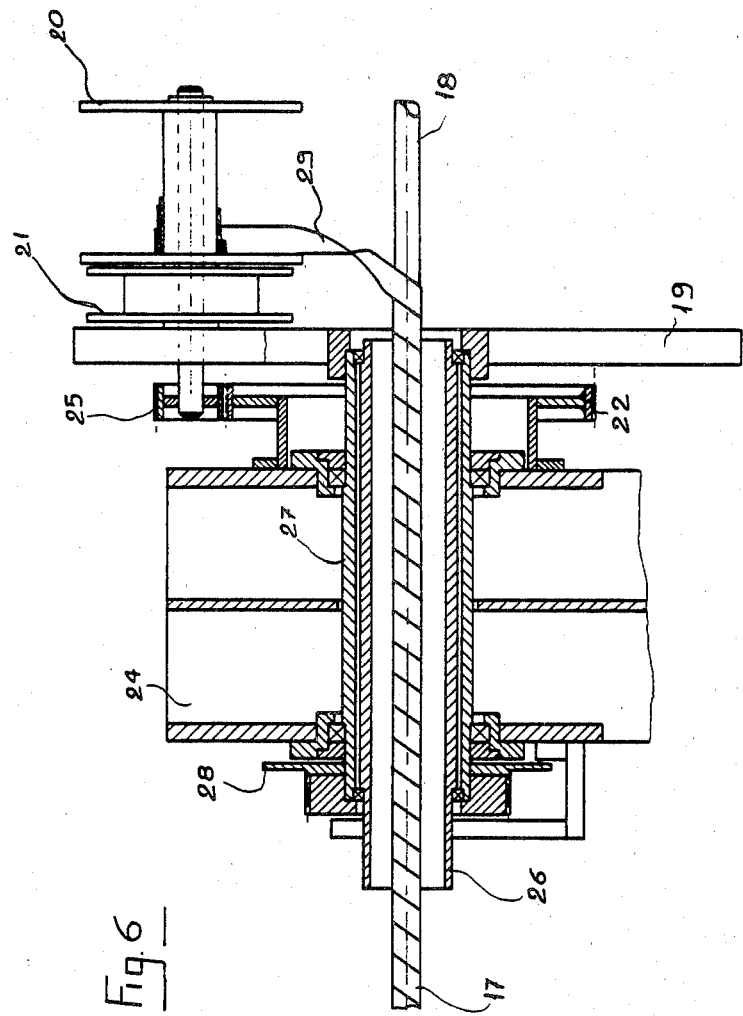
FIG. 6 is a longitudinal section through the unwrapping unit of FIG. 5.

In FIGS. 5 and 6, the reference numerals 6' and 6" respectively indicate the driving unit for the possibly vulcanized formed tube 17 and the driving unit for the unwrapped finished tube 18. 24 indicates the support column for the unwrapping unit on which the fixed support cylinder 26 rests, 19 indicates the rotating disc concentric to the feed axis of the tube, this disc being constructed of a material which is light or is lightened by means of apertures or the like, and which during its movement detaches the wrapping applied to the outer surface of the possibly vulcanized formed tube. The disc 19 is driven by the motor 23, by way of the cylinder 27 which rotates on the fixed cylinder 26. The collection spool 20 is fixed on the disc 19, with the friction disc 21 interposed. The spool 20, besides being dragged by the motion of the disc 19, also engages with the ring gear 22 by way of pinion 25, which causes it to rotate about its own axis.

By suitably adjusting the unwrapping speed transmitted by the motor to the disc 19 and the pitch of the ring gear 22, a complete rewinding of the entire tape 29 detached from the finished tube 18 is obtained.

FIG. 6 also shows the brake disc 28 for the rotating disc 19. When removed and rewound automatically by means of the unwrapping unit of FIGS. 5 and 6, the wrapping tape (generally nylon tape) can be reused several times.

The process and apparatus illustrated on the accompanying drawings represent only a preferred embodiment, and various modifications can be made to the details thereof without leaving the scope of the inventive idea.

It is possible, for example, to mount the collection spool 20 of the unwrapping unit concentric to the advancing tube, in a manner analogous to the spools of the spiral forming units.

It should also be noted that the new apparatus comprises control and synchronization means which automatically vary the speeds of the spiral forming and unwinding units in accordance with the feed speed of the metal core. These control and synchronization means in all cases enable all the stages of the process to be carried out continuously with minimum use of labor, and eliminate the down times normally existing between one stage and another.

The new process according to the present invention consequently has the following advantages over processes of the known art: it requires minimum use of labor; it enables any type of tube to be produced without limitation on length or quality, with diameters for example variable from 15 to 60 mm; it considerably reduces operating time and thus correspondingly increases hourly production; it allows production with absolutely constant characteristics; and offers the possibility of continuous operation with a self-sufficiency which is far greater than that attained up to the present time.

I claim:

1. An apparatus for producing reinforced tubing by applying tapes to a metal core, comprising:
   at least two units for moving a metal core rectilinearly;
   at least two spiral-forming units for successively applying tapes to the moving metal core, as a spiral, forming a continuous layer, each of said spiral forming units comprising:
   a roll of tape concentric to the core;
   a disc adjacent to said roll and concentric to said core;
   tensioning arms secured to said disc, providing tension and a desired inclination to said tape; and
   means for driving said roll and means for driving said disc, said roll and said disc being driven with independent rotary motion and in opposite directions.

2. An apparatus as claimed in claim 1, wherein the disc comprises two fixed tensioning arms of suitable inclination for taking-up and tensioning the tape, and a mobile tensioning arm of limited stroke for absorbing abnormal tensions created in the tape.

3. An apparatus as claimed in claim 1, wherein the spiral forming unit comprises a tightening arm fixed on a fixed disc which opposes the rotating roll, said arm resting on the tape and ensuring the absence of irregularities before its application on to the advancing core or on to the underlying layers formed in preceding units.

4. An apparatus as claimed in claim 1, wherein an outer forming tape is applied by one of said spiral forming units, and one of said units for moving the metal core is at the end of the apparatus, further comprising an unwrapping unit before the end unit for moving, for automatically detaching and rewinding the outer forming tape for the finished tube.

5. An apparatus as claimed in claim 4, wherein the unwrapping unit comprises a disc rotating concentrically to the metal core in a direction such as to cause the outer tape to detach from the tube by dragging, the end of the tape being fixed to a spool pivoted on said disc and driven with its own rotary motion in the opposite direction to the rotary motion of the disc, thus enabling the detached tape to be continuously and totally wound.

* * * * *